United States Patent [19]

Niederer et al.

[11] Patent Number: 4,478,302

[45] Date of Patent: Oct. 23, 1984

[54] EGG WEIGHING MEANS

[75] Inventors: Thomas O. Niederer; Lee H. Niederer, both of Titusville, N.J.

[73] Assignee: Otto Niederer Sons, Inc., Pennington, N.J.

[21] Appl. No.: 435,427

[22] Filed: Oct. 20, 1982

[51] Int. Cl.$^3$ ..................... G01G 19/00; A01K 43/08; B65G 47/22

[52] U.S. Cl. .................................... 177/145; 209/513; 209/592; 198/493; 198/504

[58] Field of Search ................ 177/145; 209/592-596, 209/513; 198/493, 504, 505

[56] References Cited

U.S. PATENT DOCUMENTS

| | | | |
|---|---|---|---|
| 2,246,597 | 6/1941 | Niederer et al. . | |
| 2,461,308 | 2/1949 | Brown . | |
| 2,521,876 | 9/1950 | Stake | 209/593 |
| 2,646,168 | 7/1953 | Niederer et al. . | |
| 2,692,133 | 10/1954 | Niederer et al. . | |
| 2,818,174 | 12/1957 | Powell | 209/596 |
| 2,961,087 | 11/1960 | Reading . | |
| 3,010,598 | 11/1961 | Butterfield . | |
| 3,349,907 | 10/1967 | Niederer et al. . | |
| 3,807,555 | 4/1974 | Niederer . | |
| 3,907,112 | 9/1975 | Sheporalov et al. . | |
| 3,980,147 | 9/1976 | van der Schoot . | |
| 4,084,698 | 4/1978 | Niederer . | |
| 4,403,669 | 9/1983 | Raz | 177/145 |

*Primary Examiner*—George H. Miller, Jr.
*Attorney, Agent, or Firm*—Sperry, Zoda & Kane

[57] ABSTRACT

A device for weighing eggs is disclosed which is usable with a two element egg supporting conveyor and is particularly usable for the weighing of eggs while they are moving through a conveying system. The present invention actually places the eggs upon two rail members which are positively secured with respect to a high speed weighing means such as an electronic weighing means to very quickly determine the proper grade. The egg weighing device includes a delivery ramp for lifting the egg out of the egg receiving recess defined by the supporting members of the conveying configuration. The delivery ramp actually delivers the egg through a descending ramp section to the weighing platform. This weighing platform is positively secured with respect to the electronic weighing device to facilitate a high speed determination of the weight of the egg while the egg is traveling over the weighing platform. This platform preferably includes two longitudinally extending rails to facilitate secure holding of the egg and to allow longitudinal movement of the egg as it is urged by the egg conveying configuration.

16 Claims, 9 Drawing Figures

EGG WEIGHING MEANS

BACKGROUND OF THE INVENTION

1. Field of the Invention

The present invention deals with a design for egg grading. It is customary during the processing of eggs from a hen house to a grocery store to include a grading station which determines the overall weight and size of an egg such that appropriate pricing and grouping is made possible. The present invention deals with the design which makes use of the high speed properties of electronic or other similar weighing means for determining overall egg weight.

2. Description of the Prior Art

Prior art devices for the weighing of eggs are shown in many patents such as U.S. Pat. Nos. 3,349,907 on an Egg Grader and U.S. Pat. No. 3,807,555 on Egg Grading Equipment. Other examples include U.S. Pat. Nos. 3,907,112; 3,980,147; 3,010,578; 2,461,308 and 1,875,811.

These devices show various designs for determining the weight of eggs individually or several at a time. None of these devices however has the high speed properties of the present invention. And most particularly none of these designs comtemplates the possibility of weighing the eggs while the eggs are actually moving across the weighing station. For these reasons the present invention is deemed to be a patentably distinguishable improvement thereover.

SUMMARY OF THE INVENTION

The present invention provides an egg weighing means capable of the high speed grading of eggs while the eggs themselves are still moving through the conveying system. This egg weighing means is particularly usable when eggs are conveyed by a plurality of egg transfer bars defining an array or a line of egg receiving recesses each including two supporting members for holding the egg in the position for conveyance. The egg weighing means is also particularly usable with egg transfer bars including an abutment means secured in the forward edge of each succeeding trailing transfer bar. In other words an egg located within a particular egg receiving recess wherein the support members of that recess are held by a given transfer bar will be abutted by the forwardmost edge of the next trailing transfer bar during certain points of movement through the egg weighing means of the present invention.

The egg weighing means includes an egg lifting device which is longitudinally oriented along a conveying line of egg receiving recesses and is positioned to selectively extend upwardly between the two support members. In this manner the egg lifting means will extend into the egg receiving recess in such a manner as to softly lift an egg vertically out of engagement with respect to the support members into a position such that it is capable of being engaged by the abutment means of the next trailing transfer bar.

A delivery ramp is positioned directly adjacent to this egg lifting means in such a manner as to receive an egg from the lifting means and support the egg while it is being pushed. The egg will travel across the upper surface of the delivery ramp while being pushed by the abutment means of the next trailing transfer bar. The egg will be then delivered by the delivery ramp to an egg weighing platform located adjacent to this delivery ramp. The weighing platform will be securely connected with respect to a weighing means which may preferably be of an electronic configuration to provide high speed weight determination. The weighing means will thereby sense downward weight exerted upon the weighing platform by the egg as it is moving therealong. In order to allow the egg to be separated from the abutment means at the moment the weighing operation takes place it is necessary to include a gas delivery means which is located along the path of egg travel immediately upstream from the weighing platform. This gas delivery means will deliver a stream of a gas such as air immediately upstream from the weighing platform to exert a force against the trailing portion of the shell of an egg to move the egg away from contact with the abutment means momentarily as the egg moves onto the weighing platform such that by the time the abutment means catches up with the egg the weighing action will have been completed.

A removable ramp means is also positioned adjacent the egg weighing platform to receive an egg therefrom and return it to the egg receiving recess of the conveying means. The removable ramp means basically includes a downwardly extending ramp allowing the egg as it is moved by the abutment means therealong to again come to rest upon the two egg support members of the egg receiving recess.

Preferably the egg lifting means will include a drive shaft extending laterally across the path of egg movement through this egg lifting means. In this manner rotation of the uppermost portion of the egg lifting means will be made possible to allow gradual movement and alignment of the egg as it is moved toward the weighing station. The drive shaft preferably will extend through a supporting wheel and will be fixedly secured with respect to the supporting wheel. This supporting wheel will preferably also include rotating star means on the outer portions thereof forming rotatably moving rails or edges which cause the egg to be lifted gently out of the egg receiving recess onto the weighing path with minimal chance of damage thereto. Preferably the edges of the egg lifting means will extend between the support members of the egg receiving recess to gently lift the egg out of that recess.

In the configuration of the present design the gas delivery means has been preferably positioned extending upward from below the delivery ramp means to exert a downstream and slightly upward bias on the egg in order to aid it in separating from the abutment surface of the next trailing egg transfer bar.

The weighing platform of the present invention is preferably configured having two rail members which allows the egg to gently be in contact with these rail members as it moves over the weighing platform. The position of the egg while on the weighing platform is critical and it must be separated from the leading edge of the next trailing transfer bar. To facilitate in this separation it is possible to form the delivery ramp means to include a descending ramp section at the rear portion thereof immediately adjacent to the weighing platform such that there is a slight tendency of the egg to increase speed by descending down the descending ramp section in such a manner as to further separate itself from the abutment surface of the trailing transfer bar. This descending ramp section can be formed as a downwardly inclined ramp to come down to the level of the weighing means or can be configured as two delivery rail members which gradually have the distance therebetween increased as the egg travels from the upstream edge of the descending ramp section to the downstream edge of the descending ramp section. This is an equivalent structure to having a downwardly inclined ramp since the vertical height of the egg itself will decrease due to the wider spread of the supporting rail. With either configuration a means is disclosed in the form of a descending ramp section for aiding separation of the egg from the abutment surface.

It is an object of the present invention to provide a means for the high speed grading of eggs.

It is an object of the present invention to provide a means for the weighing of eggs while the eggs are still being conveyed through the system.

It is an object of the present invention to provide a means for weighing of moving eggs.

It is an object of the present invention to provide a means for electronically weighing eggs at extremely high speed.

It is an object of the present invention to provide a means for weighing eggs which gently lifts eggs out of egg receiving recesses defined by two support members for each such recess.

It is an object of the present invention to provide an egg weighing means including a rotating star member for gently transferring eggs from the conveying means to the egg weighing means.

It is an object of the present invention to provide an egg weighing means which includes a movable star member to facilitate the straightening of an egg which is located in a cocked position upon an egg transfer bar.

It is an object of the present invention to provide an egg weighing means wherein the egg is being conveyed through a system however at the moment of weighing the egg is still moving and yet it is not in contact with any portion of the system and is only in contact with the weighing platform.

It is an object of the present invention to provide an egg weighing means which is usable with an abutment means which moves eggs through a processing line wherein the egg is separated from the abutment surface by a stream of air.

It is an object of the present invention to provide an egg weighing means which includes a delivery ramp means including two rail members to facilitate delivery of an egg from a recess of an egg conveying system onto a weighing platform.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
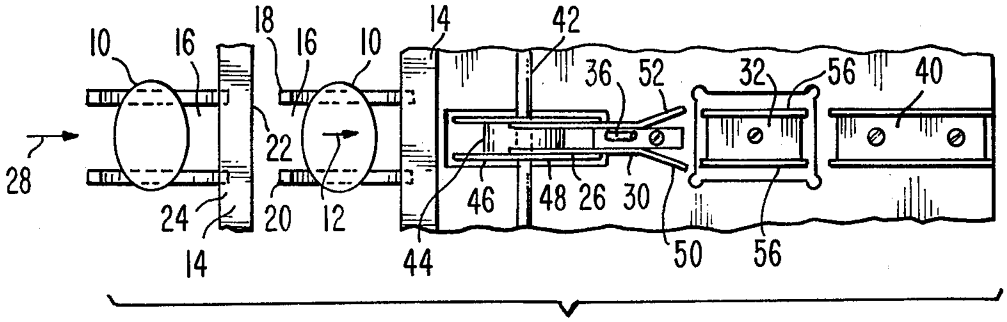
FIG. 1 is a top plan view of an embodiment of the egg weighing means of the present invention.
Figure 2:
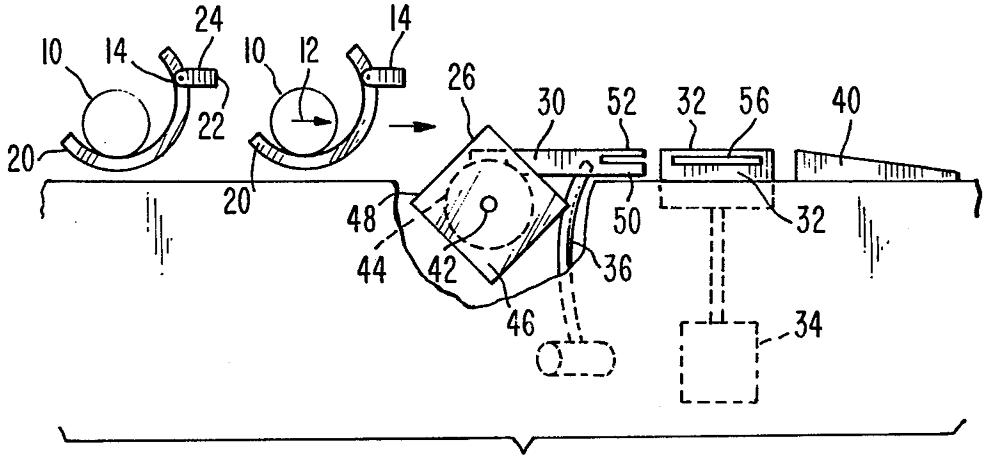
FIG. 2 is a side plan view of the embodiment shown in FIG. 1.

The present invention provides a means for weighing of eggs at very high speeds. In this embodiment the eggs 10 are shown being conveyed in a movement direction 12 by a plurality of egg transfer bars 14. Each transfer bar extends laterally across the direction of conveying and defines, in this embodiment, six egg receiving recesses 16. A plurality of transfer bars are located positioned along the longitudinal direction of the egg conveying means to thereby define an array of six egg receiving recesses 16 laterally and any number longitudinally.

Each egg receiving recess 16 is defined by a first support member 18 and a second support member 20 which are adapted to be positioned spacially disposed from one another in such a manner as to define the egg receiving recesses 16 for holding eggs 10 therein.

The present invention is designed to be useful with the above defined egg transfer bar system which is set forth in more detail in U.S. Pat. No. 4,258,839, patented Mar. 31, 1982 to the same inventors and assignee as the present invention.

The present invention initially includes an egg lifting means 26 which is adapted to lift an egg out of the egg receiving recess 16 in such a manner as to eliminate contact between support members 18 and 20 and the eggs 10. In this embodiment the egg lifting means 26 will include a support wheel 44 securely mounted to a drive shaft 42 to allow rotating movement of the supporting wheel 44 as the drive shaft 42 is itself rotated. The drive shaft should extend laterally across the direction of egg conveyance and will include mounted thereon a supporting wheel 44 along each longitudinally extending rows of egg receiving recesses 16. To facilitate lifting of eggs 10 from the support members 18 and 20 a rotating star means 46 may be mounted on each opposite side of each supporting wheel 44. Preferably each rotating star means 46 includes a plurality of edges 48 which are shown in this embodiment as four such edges. Therefore with this configuration the rotating star means 46 when viewed from the side actually appears as a square. When rotated such that the upper moving portion of the rotating star means 46 is moving in the same direction as the conveyor the edges 48 as they contact the eggs 10 will cause them to be lifted upwardly out of the recess 16.

The egg lifting means 26 will then deliver the eggs 10 to a delivery ramp means 30. Preferably this delivery ramp means 30 includes two longitudinally extending rails to aid in supporting of the egg. Since the egg 10 is no longer in contact with the egg receiving recess 16 the leading edge of the next adjacent upstream trailing edge transfer bar 24 will contact the rear surface or trailing portion 38 of the egg. This surface is defined as the egg abutment means 22. This abutment means will then push the egg in the conveying line direction 28 on the rails of the delivery ramp means 30.

A weighing platform 32 is positioned adjacent to the delivery ramp means 30 to receive an egg for sensing the proper grade thereof. This weighing platform is preferably fixedly secured with respect to a weighing means 34 which may be any high speed type weighing means such as being electronic. In order to insure an accurate determination of the weight of the egg it is necessary at the moment of weighing for the egg abutment means 22 not to be in contact with the trailing portion 38 of the egg. For this purpose an egg urging means such as a gas delivery means 36 is positioned below the delivery ramp means in this embodiment in such a fashion as to blow gas or air onto the trailing portion 38 of the egg and in this manner slightly separate the egg from the abutment means 22. It is entirely possible that the egg could be urged in the direction of conveyance by an apparatus other than one which supplies pressurized air. For instance a tab member could extend downwardly from above the conveyor or from below the conveyor and tap the egg on the rear surface thereof and thereby slightly disengage it from the trailing bar. It is also possible that a suction element could contact or be positioned in close proximity to the front edge of the egg to thereby pull it out of contact with respect to the bar trailing thereafter. In any of these configurations the same basic design is disclosed having an egg conveying means where an egg is lifted therefrom and weighed while moving across a weighing platform. These various different means are used to separate the egg from any portion of the conveyor which may be contacting the outer surface of the egg which would thereby provide inaccurate readings. These different configurations for egg urging means are all within contemplation of the present invention. In this manner a more accurate reading of the weight of the egg will be sensed by the electronic or other weighing means 34.

After the weighing operation is completed the egg will again be contacted or picked up by the egg abutment means 22 and be urged along the rail members which may be defined on the egg weighing platform 32 and be caused to exit that platform and move on to a removable ramp means 40. This removable ramp means is preferably inclined downwardly to allow the egg to move further downwardly until it again falls to rest being supported by the first and second egg support members 18 and 20 and thereby be conveyed away for further processing.

Figure 3:
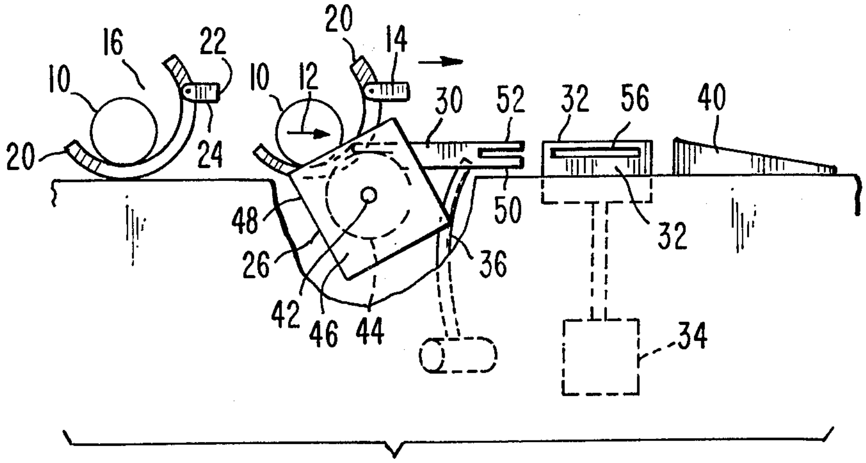
FIG. 3 is an illustration of the embodiment shown in FIG. 2 with the egg shown being lifted by the egg lifting means.
Figure 4:
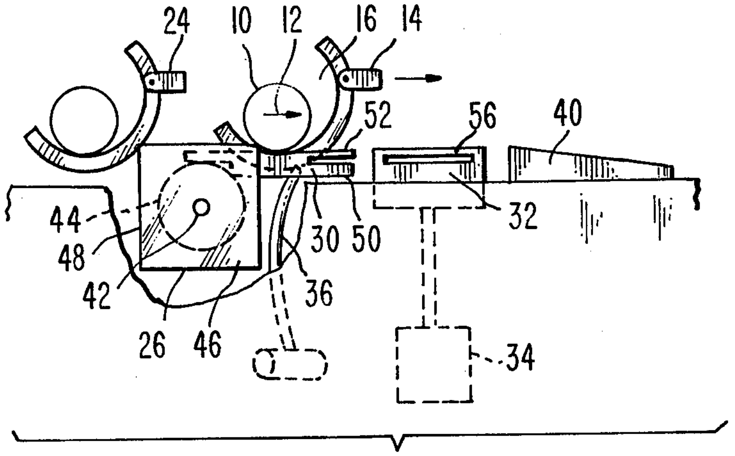
FIG. 4 is an illustration of the embodiment shown in FIG. 2 with the egg traveling upon the delivery ramp means.
Figure 5:
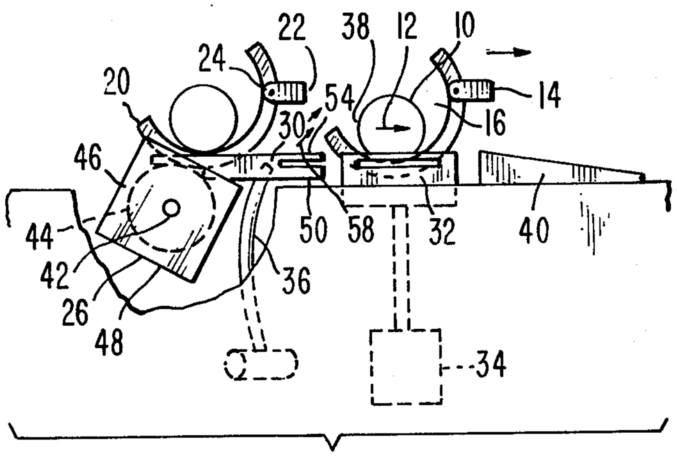
FIG. 5 is an illustration of the embodiment shown in FIG. 2 with the egg being located in the weighing position.

In this preferred embodiment the egg lifting means 26 formed by the rotating squares or edges 48 will extend from one another to a distance not greater than the distance between the first and second support members 18 and 20 and thereby facilitate placement therebetween for lifting of the eggs as best shown in FIG. 3 herein. The delivery ramp means 30 as well as the weighing platform 32 and the removable ramp means 40 should all be preferably as shown in this embodiment include two separate rail members for supporting the eggs at two locations. In this manner if an egg is fed to the weighing apparatus when it is not laying perfectly within the egg receiving recess 16 such as being cocked or the like the dual rail members and especially the moving rotating star means 46 will tend to re-orient the egg in the normal processing position. Also the two longitudinally extending rails 56 of the weighing platform 32 tend to accurately sense the actual weight of an egg due to the dual points of contact between the egg and the weighing platform.

Figure 6:
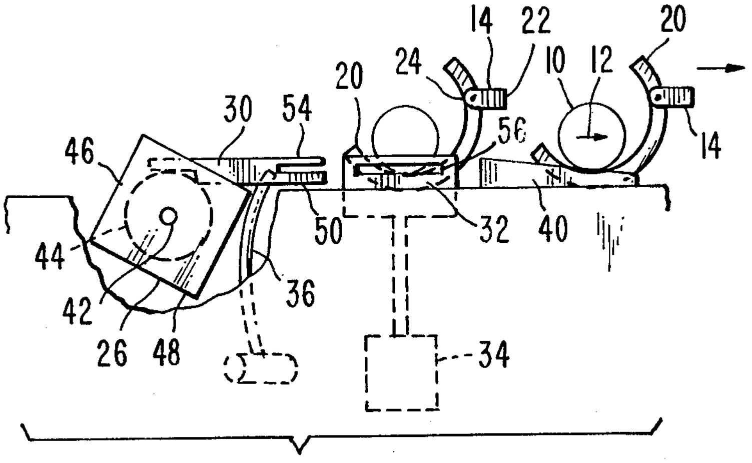
FIG. 6 is an illustration of an embodiment of the egg weighing means of the present invention showing the egg being replaced into the egg receiving recess by the removable ramp means and also showing a downwardly inclined section of the delivery ramp means.
Figure 7:
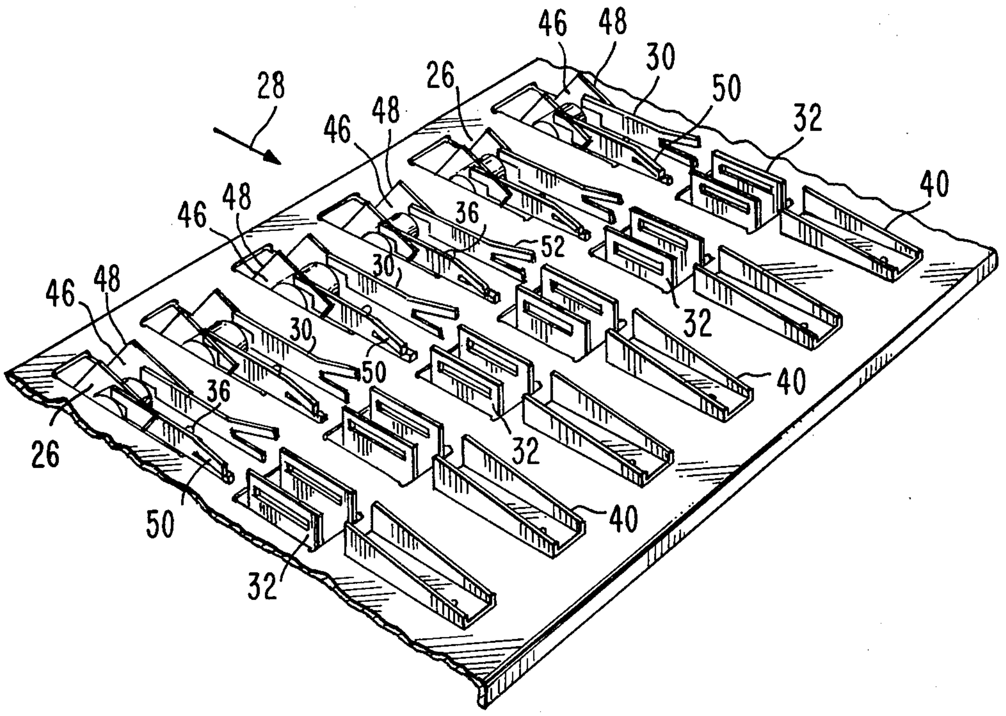
FIG. 7 is a perspective view of an embodiment of the egg weighing means of the present invention.
Figure 8:
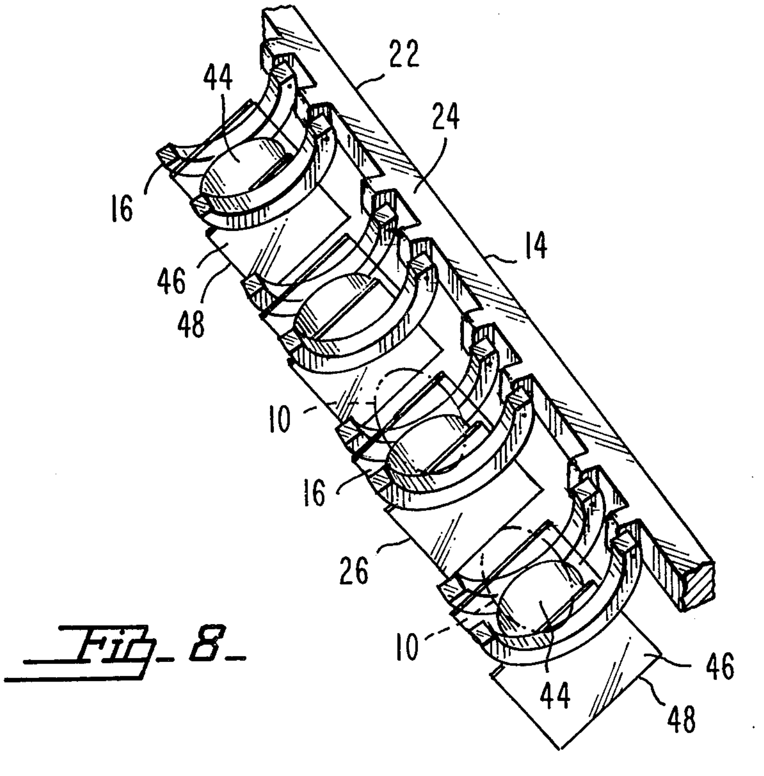
FIG. 8 is a side perspective illustration of an embodiment of the egg weighing means of the present invention showing the conveying means moving eggs thereover.
Figure 9:
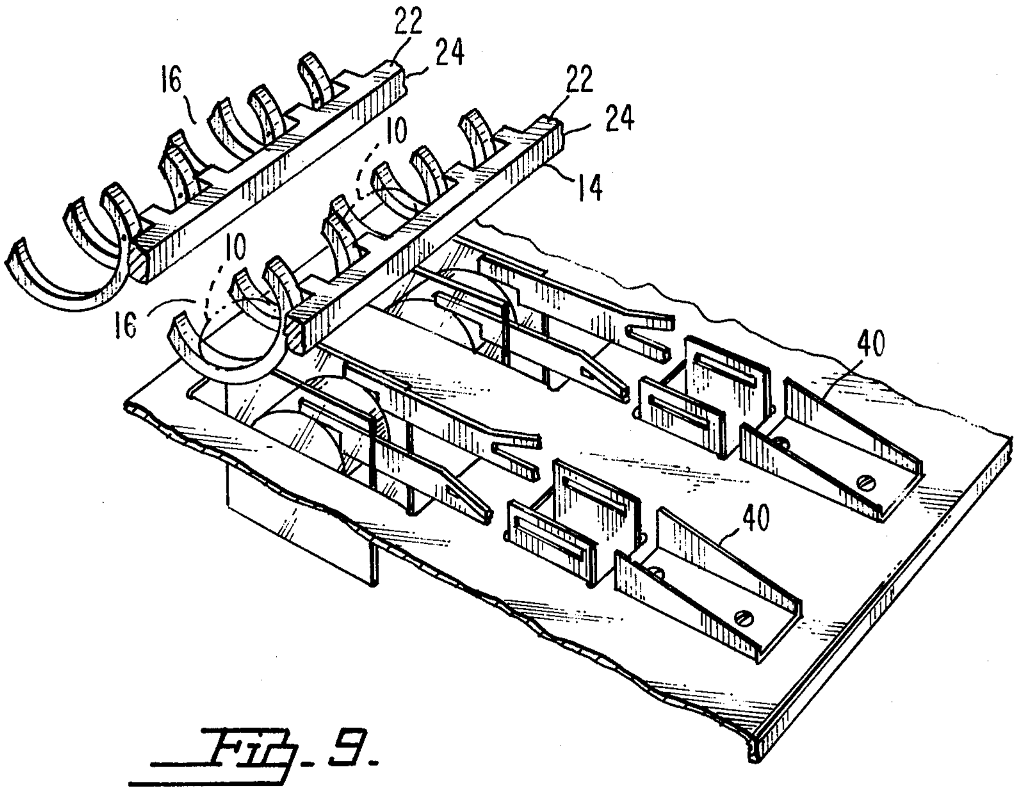
FIG. 9 is a perspective illustration of an embodiment of the egg weighing means of the present invention showing the series of egg transfer bars moving eggs across the upper surface thereof.

It may be necessary under certain operating conditions and with certain egg sizes to provide an increased means for separating the egg 10 from the egg abutment means 22 of the trailing egg transfer bar 24. For this configuration a rear portion of the delivery ramp means 30 will be defined as a descending ramp section 50. This descending ramp section will allow the egg to start to roll down the hill and thereby facilitate separation of the egg from the abutment means 22. This separation will be in addition to the separation caused by the gas or air delivery means 36 blowing on the trailing portion of the egg 38. This descending ramp section as shown in FIG. 6 would be merely a downwardly inclined section allowing the egg to roll downwardly on the two rail members of the delivery ramp means 30. Another possible configuration is shown in FIGS. 1 through 5 which include two delivery rail members 52 which extend not downwardly but actually increase in separation as the egg is moving downstream. This is best shown in FIG. 1, where the trailing portion of the delivery rail members 52 are shown and increasingly separated with respect to one another. Due to the general roundness of the egg if it is supported on two rails and if those rails gradually increase the distance with respect to one another the egg will tend to travel downwardly as it moves along the delivery ramp means. This is equivalent to an inclined ramp as shown in FIG. 6. Each of these will tend to urge the egg away from the egg abutment means 22 and will aid the moving air 58 in the mission of allowing the egg to be separated from all surrounding structure except the weighing platform 32 at the moment of egg weighing. This will allow a high speed weighing operation while the egg is actually still moving due to the momentum thereof along the longitudinally extending rails 56 of the platform.

The present invention and in particular this embodiment is quite novel since it allows the weighing of eggs while they are still moving within the system yet wherein this weighing occurs at a point where the egg is not contacting the system at any location but is only contacting the weighing platform. This is made possible by either the downwardly inclined ramp and/or the gas or air being blown against the trailing portion 38 of eggs 10.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An egg weighing means, particularly usable for high speed weighing of moving eggs, which eggs are being carried by an egg conveying means, said egg weighing means comprising:

(a) an egg lifting means longitudinally oriented along a conveying line of the egg conveying means and positioned to selectively extend upwardly to vertically lift a moving egg out of engagement with respect to the egg conveying means;

(b) a delivery means positioned directly adjacent to said egg lifting means and adapted to receive a moving egg therefrom and support the egg above the egg conveying means;

(c) a weighing platform positioned adjacent to said delivery means to receive moving eggs therefrom for weighing;

(d) a weighing means connected to said weighing platform to sense downward weight exerted on said weighing platform by an egg moving thereon;

(e) an egg urging means located along the path of egg travel adjacent said weighing platform to urge the moving egg to continue to move along said weighing platform in the direction of movement of the egg conveying means without contacting the egg conveying means; and (f) a removal means positioned adjacent to said egg weighing platform to receive an egg therefrom and return it to the egg conveying means.

2. The weighing means as defined in claim 1 wherein said delivery means is a delivery ramp means.

3. The weighing means as defined in claim 1 wherein said removal means is a removal ramp means.

4. The weighing means as defined in claim 1 wherein said egg urging means comprises a gas delivery means located along the path of egg travel immediately upstream from said weighing platform to deliver a stream of gas adjacent the trailing portion of the shell of an egg to remove the egg from contact with the egg conveying means.

5. An egg weighing means, particularly usable for high speed weighing of moving eggs conveyed by a plurality of egg transfer bars each including at least one egg receiving recess defined by two support members and further including an egg abutment means thereadjacent secured to the next trailing transfer bar, said egg weighing means comprising:

(a) an egg lifting means longitudinally oriented along a conveying line of egg receiving recesses and positioned to selectively extend upwardly between the two support members into the egg receiving recess to vertically lift an egg located therein out of engagement with respect to the support members and into engagement with respect to the egg abutment means of a following bar as the egg receiving recess and support members are conveyed therealong;

(b) delivery ramp means positioned directly adjacent to said egg lifting means to receive an egg therefrom and support the egg while being pushed therealong by the egg abutment means of a following bar;

(c) a weighing platform positioned adjacent to said delivery ramp means to receive eggs therefrom for weighing;

(d) a weighing means connected to said weighing platform to sense downward weight exerted on said weighing platform by an egg moving thereon;

(e) a gas delivery means located along the path of egg travel immediately upstream from said weighing platform to deliver a stream of gas adjacent the trailing portion of the shell of an egg to remove the egg from contact with the egg abutment means of a following bar immediately prior to movement of the egg onto said egg weighing platform;

(f) a removable ramp means positioned adjacent to said egg weighing platform to receive an egg therefrom and return it to the egg receiving recess of the conveying means.

6. The egg weighing means as defined in claim 5 wherein said egg lifting means includes a drive shaft extending laterally with respect to the path of egg movement through said egg lifting means to allow rotation thereof with the uppermost portion thereof moving in the same direction as egg movement.

7. The egg weighing means as defined in claim 6 wherein said egg lifting means further includes a support wheel secured with respect to said drive shaft to be rotatable therewith, said egg lifting means further including a rotating star means secured to the outer sides of said support wheel, said rotating star means including a plurality of edges to lift an egg above the egg receiving recess for placement onto said delivery ramp means.

8. The egg weighing means as defined in claim 7 wherein said rotating star means includes four edges.

9. The egg weighing means as defined in claim 5 wherein said gas delivery means extending upward from below said delivery ramp means.

10. The egg weighing means as defined in claim 5 wherein said gas delivery means delivers a stream of air.

11. The egg weighing means as defined in claim 5 wherein said delivery ramp means includes a descending ramp section for lowering the elevation of an egg thereon for gentle delivery to the weighing platform.

12. The egg weighing means as defined in claim 11 wherein said descending ramp section includes a downwardly inclined section to deliver the egg to the weighing platform.

13. The egg weighing means as defined in claim 11 wherein said delivery ramp means includes two delivery rail members running longitudinally with respect to the path of egg movement and spaced with respect to one another to support a moving egg thereon, said rail members being spaced further with respect to one another along the descending ramp section to lower the height of the egg position therealong.

14. The egg weighing means as defined in claim 13 wherein said weighing platform includes two longitudinally extending rails spaced laterally with respect to one another equal to the lateral spacing between said delivery rail members within said extending ramp section.

15. The egg weighing means as defined in claim 5 wherein said egg weighing means is electronic.

16. An egg weighing means, particularly usable for high speed weighing of moving eggs conveyed by a plurality of egg transfer bars each including at least one egg receiving recess defined by two support members and further including an egg abutment means thereadjacent secured to the next trailing transfer bar, said egg weighing means comprising:

(a) an egg lifting means longitudinally oriented along a conveying line of egg receiving recesses and positioned to selectively extend upwardly between the two support members into the egg receiving recess to vertically lift an egg located therein out of engagement with respect to the support member and into engagement with respect to the egg abutment means of a following bar as the egg receiving recess and support members are conveyed thereover, said egg lifting means further including:

1. a drive shaft extending laterally with respect to the path of egg movement through said egg lifting means;

2. a support wheel secured with respect to said drive shaft to be rotatable therewith; and 3. a rotating star means secured to the outer sids of said supporting wheel and including four edges to lift an egg above the egg receiving recess for urging movement through said egg weighing means;

(b) a delivery ramp means positioned directly adjacent to said egg lifting means to receive an egg therefrom and support the egg while being pushed therealong by the egg abutment means of a following bar, said delivery ramp means including a descending ramp section for lowering the elevation of an egg thereon for gentle delivery through the egg weighing apparatus, said delivery ramp means further including two delivery rail members running longitudinally with respect to the path of egg movement and spaced with respect to one another to support a moving egg thereon, said rail members being spaced further with respect to one another along the descending ramp section to lower the height of the egg positioned therealong;

(c) a weighing platform positioned adjacent to said delivery ramp means to receive eggs therefrom for weighing, said weighing platform including two longitudinally extending rails spaced laterally with respect to one another equal to the lateral spacing between said delivery rail members within said descending ramp section;

(d) an electronic weighing means connected to said weighing platform to sense downward weight exerted on said weighing platform by an egg moving thereon;

(e) an air delivery means extending upward from below said delivery ramp means at a position along the path of egg travel immediately upstream from said weighing platform to deliver a stream of air adjacent the trailing portion of the shell of an egg to remove the egg from contact with the egg abutment means of a following bar immediately prior to movement of the egg onto said egg weighing platform;

(f) a removal ramp means positioned adjacent to said egg weighing platform to receive an egg therefrom and return it to the egg receiving recess of the conveying means.

* * * * *